US008415441B1

(12) United States Patent
Alamo et al.

(10) Patent No.: US 8,415,441 B1
(45) Date of Patent: Apr. 9, 2013

(54) METHODS OF CONSTRUCTING POLYOLEFINS HAVING REDUCED CRYSTALLINITY USING A DIIMINE BASED CATALYST

(71) Applicant: The Florida State University Research Foundation, Inc., Tallahassee, FL (US)

(72) Inventors: Rufina Alamo, Tallahassee, FL (US); Geoffrey Coates, Lansing, NY (US); Carolina Ruiz-Orta, Tallahassee, FL (US)

(73) Assignees: The Florida State University Research Foundation, Inc., Tampa, FL (US); Cornell University Cornell Center for Technology, Enterprise & Commercialization, Ithaca, NY (US)

( * ) Notice: Subject to any disclaimer, the term of this patent is extended or adjusted under 35 U.S.C. 154(b) by 0 days.

(21) Appl. No.: 13/644,703

(22) Filed: Oct. 4, 2012

Related U.S. Application Data

(63) Continuation of application No. 13/012,402, filed on Jan. 24, 2011, which is a continuation-in-part of application No. 12/813,131, filed on Jun. 10, 2010.

(60) Provisional application No. 61/185,832, filed on Jun. 10, 2009.

(51) Int. Cl.
*C08F 110/06* (2006.01)
*C08F 210/00* (2006.01)

(52) U.S. Cl. ........................................ 526/351; 526/348

(58) Field of Classification Search .................... 526/351
See application file for complete search history.

(56) References Cited

U.S. PATENT DOCUMENTS

| | | | |
|---|---|---|---|
| 6,670,297 B1 * | 12/2003 | Brookhart et al. | 502/103 |
| 6,927,256 B2 | 8/2005 | Stevens et al. | |
| 7,022,774 B2 | 4/2006 | Fetters et al. | |
| 7,060,754 B2 | 6/2006 | Stevens et al. | |
| 7,250,470 B2 | 7/2007 | Stevens et al. | |
| 7,268,243 B2 | 9/2007 | Coates et al. | |
| 7,300,994 B2 | 11/2007 | Coates et al. | |
| 7,304,172 B2 | 12/2007 | Coates et al. | |
| 7,344,775 B2 | 3/2008 | Stevens et al. | |
| 7,399,822 B2 | 7/2008 | Coates et al. | |
| 7,560,523 B2 | 7/2009 | Coates et al. | |
| 7,642,324 B2 | 1/2010 | Diamond et al. | |
| 7,674,873 B2 | 3/2010 | Coates et al. | |
| 2006/0260677 A1 | 11/2006 | Sogah et al. | |
| 2010/0036077 A1 | 2/2010 | Coates et al. | |

OTHER PUBLICATIONS

Jeon et al., Effect of Comonomer Type on the Crystallization Kinetics and Crystalline Structure of Random Isotactic Propylene 1-alkene Copolymers, Polymer, 2009, vol. 50, pp. 832-844.
Alamo et al., Effect of ppm Levels of Long Chain Branching on the Crystallization of Isotactic Poly (propylenes) from the Melt and from Solution, American Physical Society, APS March Meeting 2009, abstract #Z19.008.
Ruiz-Orta et al., Melting and Crystalline Properties of Isotactic Poly(propylenes) with 1,3 Defects, American Physical Society, APS March Meeting 2010, abstract #S1.020.
Hosier et al., Formation of the Alpha and Gamma Polymorphs in Random Metallocene -Propylene Copolymers. Effect of Concentration and Type of Comonomer, Macromolecules, 2003, vol. 36, pp. 5623-5636.
Cherian et al., A C-Symmetric, Living Alpha-Diimine Ni(II) Catalyst: Regioblock Copolymers From Propylene, J. Am. Chem. Soc., 2005, vol. 127, No. 40, pp. 13770-13771.
Rose et al., C2-Symmetric Ni(II) Alpha-Diimines Featuring Cumyl-Derived Ligands: Synthesis of Improved Elastomeric Regioblock Polypropylenes, Macromolecules, 2008, vol. 41, pp. 9548-9555.
Alamo et al., Structural and Kinetic Factors Governing the Formation of the Gamma Polymorph of Isotactic Polypropylene, Macromolecules, 1999, vol. 32, pp. 4050-4064.
Alamo et al., Crystallization Rates of Matched Fractions of MgCl2-Supported Ziegler Natta and Metallocene Isotactic Poly(Propylene)s. 1. The Role of Chain Microstructure, Macromolecules 2003, vol. 36, 1559-1571.
Jones et al., Crystalline Forms of Isotactic Polypropylene, Makromol. Chem., 1964, vol. 75, pp. 135-158.
McCord et al., C and 2D NMR Analysis of Propylene Polymers Made with Alpha-Diimine Late Metal Catalysts, Macromolecules, 2001, vol. 34, pp. 362-371.
Bruckner et al., Non-Parallel Chains in Crystalline Gamma-Isotactic Polypropylene, Nature, 1989, vol. 340, pp. 455-457.
Carman et al., Monomer Sequence Distribution in Ethylene-Propylene Rubber Measured by CNMR. 3. Use of Reaction Probability Model, Macromolecules, 1977, vol. 10, pp. 536-544.
De Rosa et al., Crystallization of the Alpha and Gamma Forms of Isotactic Polypropylene as a Tool to Test the Degree of Segregation of Defects in the Polymer Chains, Macromolecules, 2002, vol. 35, pp. 3622-3629.
De Rosa et al., Tailoring the Physical Properties of Isotactic Polypropylene Through Incorporation of Comonomers and the Precise Control of Stereo- and Regioregularity by Metallocene Catalysts, Chem. Mater., 2007, vol. 19, pp. 5122-5130.

* cited by examiner

*Primary Examiner* — Hui Chin
(74) *Attorney, Agent, or Firm* — Michele L. Lawson; Wanhua Zhao; Smith & Hopen, P.A.

(57) ABSTRACT

The invention is a novel family of polyolefins characterized by chain-walking defects of the type that add extra backbone carbons per monomer. These polyolefins display a large decrease in crystallinity relative to polyolefins known in the art. Specifically, the reduction in crystallinity is much greater than for earlier polypropylenes with a matched content of stereo or 1-alkene type defects. The claimed polyolefins can be made by a diimine-based catalyst. The defects in the polyolefin backbone are generated by a chain walking mechanism in which three or more carbons per monomer are added to the polymer backbone instead of two, as in conventional polymerization or copolymerization methods of alpha olefins. The novel polyolefins can be used in applications such as plastic wrapping, thin films, co-extrusion layers or molded parts in the absence of polymer blending or copolymerization. The cost of materials production can be reduced.

8 Claims, 19 Drawing Sheets

| | Isolated 3,1-insertion | | | Alternating (3,1)(1,2)(3,1) insertions | | | Successive (3,1)(3,1) insertions | | | | (3,1)(2,1) insertions | | | | | | (2,1)(3,1) insertions | | | |
|---|---|---|---|---|---|---|---|---|---|---|---|---|---|---|---|---|---|---|---|---|
| Peak | $a_1$ | $a_2$ | $a_3$ | $b_1$ | $b_2$ | $b_3$ | $c_1$ | $c_2$ | $c_3$ | $c_4$ | $d_1$ | $d_2$ | $d_3$ | $d_4$ | $d_5$ | $d_6$ | $d_7$ | $e_1$ | $e_2$ | $e_3$ | $e_4$ |
| Chemical shift (ppm) | 37.4 | 27.5 | 30.8 | 33.2 | 37.5 | 27.7 | 37.6 | 27.3 | 30.3 | 29.9 | 37.9 | 24.5 | 38.5 | 33.5 | 34.2-36 | 34.2-36 | 31.2 | 38.5 | 37.5 | 27.5 | 30.9 |
| Designation | $S_{\alpha\delta}$ | $S_{\beta\gamma}$ | $T_{\beta\delta}$ | $T_{\delta\delta}$ | $S_{\omega\delta}$ | $S_{\beta\gamma}$ | $S_{\omega\delta}$ | $S_{\beta\delta}$ | $S_{\gamma\delta}$ | $S_{\delta\delta}$ | $S_{\omega\delta}$ | $S_{\beta\beta}$ | $S_{\alpha\delta}$ | $T_{\gamma\delta}$ | $S_{\alpha\beta}$ | $S_{\alpha\beta}$ | $T_{\beta\gamma}$ | $T_{\omega\delta}$ | $S_{\omega\delta}$ | $S_{\beta\delta}$ | $S_{\gamma\gamma}$ |

| | Isolated 2,1 threo insertions | | | Isolated 2,1 threo insertions | | | | | | |
|---|---|---|---|---|---|---|---|---|---|---|
| Peak | $f_1$ | $f_2$ | $f_3$ | $f_4$ | $f_5$ | $f_6$ | $f_7$ | $f_{5'}$ | $f_{6'}$ | $f_{7'}$ | $f_{8'}$ |
| Chemical shift (ppm) | 43.58 | 15.73 | 34.7 | 14.5 | 37.01 | 32.6 | 35.5 | 31.09 | 15.05 | 43.29 | 15.46 | 38.77 | 34.64 | 32.38 | 35.46 | 31.27 |
| Designation | $S_{\alpha\alpha}$ | $P_{\alpha\beta}$ | $T_{\alpha\beta}$ | $P_{\alpha\gamma}$ | $T_{\alpha\gamma}$ | $S_{\alpha\beta}$ | $S_{\alpha\beta}$ | $T_{\beta\gamma}$ | $P_{\alpha\beta}$ | $S_{\alpha\alpha}$ | $P_{\alpha\gamma}$ | $T_{\alpha\gamma}$ | $T_{\alpha\beta}$ | $S_{\alpha\beta}$ | $S_{\alpha\beta}$ | $T_{\beta\gamma}$ |

Figure 5

| Complex | Polymer | Stereo (mol%)* | regio | | | | | total defects ($X_B$) (mol%) |
|---|---|---|---|---|---|---|---|---|
| | | | (a) (mol%) | (b) (mol%) | (c) (mol%) | (d) (mol%) | (f) (mol%) | |
| Rac-4 | iPP3.06 | 0.6 | 1.04* | 0.22 | 0.00 | 0.78 | 0.42 | 3.06 |
| Rac-4 | iPP3.29 | 0.5 | 1.12* | 0.49* | 0.00 | 1.18 | 0.00 | 3.29 |
| Rac-4 | iPP3.51 | 0.6 | 0.84* | 0.55* | 0.00 | 1.52 | 0.00 | 3.51 |
| Rac-4 | iPP3.64 | 0.6 | 1.27 | 0.28 | 0.14 | 1.05 | 0.30 | 3.64 |
| Rac-4 | iPP5.93 | 0.6 | 3.06 | 0.60 | 0.00 | 1.67 | 0.00 | 5.93 |
| Rac-4 | iPP8.11 | 0.7 | 3.22 | 0.63 | 0.18 | 3.22 | 0.16 | 8.11 |
| Rac-4 | iPP15.37 | 0.8 | 4.56 | 2.22 | 1.31 | 5.66 | 0.82 | 15.37 |
| Rac-1 | iPP3.33 | 0.8 | 2.53 | 0.00 | 0.00 | 0.00 | 0.00 | 3.33 |
| Rac-1 | iPP5.04 | 0.7 | 2.58 | 0.48 | 0.00 | 0.00 | 1.28 | 5.04 |
| Rac-1 | iPP6.97 | 0.6 | 4.07 | 0.82 | 0.08 | 0.00 | 1.40 | 6.97 |
| Rac-1 | iPP8.52 | 0.5 | 5.00 | 1.02 | 0.08 | 0.00 | 1.92 | 8.52 |
| Rac-1 | iPP10.22 | 0.5 | 7.15 | 1.41 | 0.15 | 0.00 | 1.01 | 10.22 |
| Rac-1 | iPP11.82 | 0.5 | 6.16 | 2.13 | 0.48 | 1.15 | 1.40 | 11.82 |
| Rac-1 | iPP15.12 | 0.7 | 7.16 | 2.96 | 0.00 | 2.67 | 1.63 | 15.12 |
| Rac-1 | iPP16.75 | 0.6 | 8.93 | 3.26 | 1.06 | 1.69 | 1.21 | 16.75 |

* Data with 30 – 40% uncertainty. All other values have < 10 % uncertainty

Figure 6

| complex | Entry | Polymer designation | propylene (g) | T (°C) | time (h) | total defects (mol%)[a] | $M_w$ (Kg/mol)[b] | $M_w/M_n$[b] |
|---|---|---|---|---|---|---|---|---|
| Rac-4 | 1 | iPP3.06 | 15 | -55 | 48 | 3.06 | 71 | 1.23 |
| Rac-4 | 2 | iPP3.29 | 15 | -55 | 6 | 3.29 | 41 | 1.18 |
| Rac-4 | 3 | iPP3.51 | 15 | -55 | 48 | 3.51 | 100 | 1.39 |
| Rac-4 | 4 | iPP3.64 | 15 | -50 | 48 | 3.64 | 209 | 1.35 |
| Rac-4 | 5 | iPP5.93 | 5 | -40 | 48 | 5.93 | 216 | 1.32 |
| Rac-4 | 6 | iPP8.11 | 5 | -35 | 48 | 8.11 | 273 | 1.30 |
| Rac-4 | 7 | iPP15.37 | 5 | -30 | 24 | 15.37 | 294 | 1.33 |
| Rac-1 | 8 | iPP3.33 | 15 | -55 | 48 | 3.33 | 19 | 1.46 |
| Rac-1 | 9 | iPP5.04 | 5 | -50 | 48 | 5.04 | 19 | 1.34 |
| Rac-1 | 10 | iPP6.97 | 5 | -48 | 42 | 6.97 | 30 | 1.25 |
| Rac-1 | 11 | iPP8.52 | 5 | -46 | 47 | 8.52 | 44 | 1.21 |
| Rac-1 | 12 | iPP10.22 | 5 | -45 | 46 | 10.22 | 44 | 1.15 |
| Rac-1 | 13 | iPP11.82 | 5 | -43 | 44 | 11.82 | 81 | 1.15 |
| Rac-1 | 14 | iPP15.12 | 5 | -40 | 24 | 15.12 | 60 | 1.14 |
| Rac-1 | 15 | iPP16.75 | 5 | -35 | 20 | 16.75 | 66 | 1.14 |

[a] Determined using $^{13}$C NMR spectroscopy in 1,1,2,2-tetrachloroethane-$d_2$ at 135 °C. [b] Molecular weight ($M_w$) and molecular weight distribution were determined by gel permeation chromatography at 140 °C in 1,2,4-trichlorobenzene.

Figure 7

METHODS OF CONSTRUCTING POLYOLEFINS HAVING REDUCED CRYSTALLINITY USING A DIIMINE BASED CATALYST

CROSS REFERENCE TO RELATED APPLICATIONS

This application is a Continuation of co-pending U.S. patent application Ser. No. 13/012,402, entitled "Polyolefins Having Reduced Crystallinity", filed Jan. 24, 2011, which is a Continuation in Part of and claims priority to U.S. application Ser. No. 12/813,131, entitled "Crystallinity Reducer", filed Jun. 10, 2010, which claims priority to U.S. Provisional Patent Application 61/185,832, entitled "Crystallinity Reducer", filed Jun. 10, 2009, each of which are incorporated herein by reference in their entirety.

BACKGROUND OF THE INVENTION

The thermodynamic, structural and mechanical properties of polyolefins depend strongly on the type, content and distribution of defects generated during synthesis. In the last two decades, the spectrum of new polyolefin materials has undergone an exponential expansion due to the development of metal coordination catalysts with properties changing from those of highly-crystalline thermoplastics to plastomers and elastomers. The materials that have been developed, which range from statistical random copolymers to stereo-bulky elastomers, exemplify the ability of new synthetic strategies to tailor structures and properties of polyolefins by a suitable choice of the coordination catalyst precursor. The availability of such a wide spectrum of polyolefins has led to significant improvements in the approaches taken to characterize their molecular microstructure, which remains a main determinant of their physical properties. Ethylene α-olefin copolymers, polypropylene homopolymer and propylene α-olefin copolymers synthesized with single-site metallocene catalysts (early metal catalyst) serve as models to predict properties of polyolefins with randomly distributed defects.

Polyolefins (isotactic or syndiotactic) are highly crystalline polymers. Polyolefins result from the polymerization of an olefin (a linear or branched hydrocarbon with at least a double bond). Typical olefins are ethene, propene, 1-butene, 3-methyl pentene, 1-hexene . . . etc. For many applications that require increasing tear and impact properties or those with the need of more transparent, more flexible and ductile materials, defects or 1-alkene comonomers are added to the polyolefin backbone to decrease crystallinity.

A new family of polypropylenes (PPs), a type of polyolefins, has been synthesized by living polymerization with late metal catalysts (see for example Cherian, A. E.; Rose, J. M.; Lobkovsky, E. B.; Coates, G. W. *J. Am. Chem. Soc.* 2005, 127, 13770-13771). These polymers are structurally distinct from PPs synthesized with early metal catalysts. Late metal catalysts enable chain-walking events; early metal catalysts do not. Specifically for iPP, the chain-walking mechanism adds (3,1) enchainments and often results in unique multi-monomer, bulky defect microstructures. A living chiral α-diimine Ni(II) catalyst can form isotactic PPs (iPPs) and allow controlled chain walking when activated with methylalumoxane (MAO) in the presence of propylene. An amorphous, regio-irregular polymer is produced at high reaction temperatures ($T_{rxn}$=0° C.) while an isotactic, regioregular polymer is obtained at low reaction temperatures ($T_{rxn}$=−60° C.). Later modifications to the α-diimine Ni(II) catalyst have yielded isotactic polyolefins at an increased rate of polymerization (see for example Rose, J. M; Deplace, F.; Lynd, N. A.; Wang, Z.; Hotta, A.; Lobkovsky, E. B.; Kramer, E. J.; Coates, G. W. *Macromolecules* 2008, 41, 9548-9555).

Enchainment via chain walking is a distinctive feature of polyolefins synthesized with the late metal catalysts resulting in extra $CH_2$ in the iPP backbone compared to defects generated by inversion or 1-alkene comonomers. The result is a chain straightening due to the extended length of the defect in the backbone, as shown schematically in FIG. 1. Crystalline polyolefins with defects generated via chain walking have unique properties, such as reduced crystallinity (see for example C. Ruiz-Orta, J. P. Fernandez-Blazquez, A. M. Anderson-Wile, G. W. Coates, R. G. Alamo *Macromolecules* 2011, 44, 3436-3451.

At present, industry reduces the crystallinity of conventional polyolefins by polymer blending or copolymerization with ethylene, 1-butene, 1-hexene or 1-octene. The novel polyolefins with chain walking defects, when used in industry, will reduce the cost of materials production by eliminating polymer blending or addition and control of a comonomer. Polyolefins with chain-walking defects that lead to chain straightening display reduced crystallinity relative to conventional polyolefins with the same number of defects. The novel polyolefins of the present invention can substitute for present-art polyolefins in a variety of applications, for example, thin films, fibers and molded parts, or any other application that require a lower crystallinity than for the homopolymer or copolymer free of chain-walking defects. The reduced crystallinity makes the polymeric materials with better processability due to their lower melting temperatures, more flexible and more transparent.

SUMMARY OF INVENTION

The invention is directed to identify all possible crystalline polyolefins with reduced level of crystallinity by the use of synthetic methods that generate unique defect microstructures by a chain walking effect. The chain walking effect produces defects in the polymer molecules that are different than those found in analog polyolefins made with present art catalysts. The chain-walking defects that are most effective for reducing the level of crystallinity are those of a successive addition or multimonomer nature. The crystalline polyolefins with properties that will be affected by the presence of chain walking defects are alkene-based homopolymers or copolymers of any length or branch geometry, for example homopolymers or copolymers derived from ethylene, propene, 1-butene, 2-butene, 1-hexene, 2-hexene, 3-hexene, 2-methyl 1-pentene, . . . etc.

In one embodiment, the isotactic polypropylenes (iPPs) are taken as examples of polyolefins undergoing chain-walking. In this specific example, the iPPs were synthesized by a late metal catalyst—living nickel α-diimine complexes, specifically, Rac-1 and Rac-4 (see U.S. Pat. No. 7,560,523). Not reported in the claims of this patent is the present new discovery that this iPP (a type of the broad group of novel polyolefins of this claim) contains regio defects characterized by isolated or multimonomer successive groups of (2,1) and (3,1) enchainments produced by a chain walking mechanism. Critical to the present claim is that each (3,1) defect generated by a chain walking effect adds three defect carbons per monomer to the polymer backbone. Each successive (2,1)(3,1) defect adds five defect carbons per 2 monomers, and each (3,1)(1,2)(3,1) defect adds eight defect carbons per three monomers to the backbone. Earlier-generation metallocene iPPs, or random copolymers, have defect units with only two carbons per monomer added to the polymer backbone. Chain straightening and the bulky nature of the defects of polyolefins synthesized by a mechanism involving the chain walking effect limits the crystallinity of the polymers.

To demonstrate the generality of the claim, two series of MAO-activated living nickel α-diimine complexes, with and without cumyl-derived ligands, have been used to catalyze iPP synthesis. The resulting polymers displayed properties with profound differences from those of iPPs and iPP copolymers made by conventional methods: lower melting temperatures and much lower degrees of crystallinity than for homopolymers or any random 1-alkene iPP copolymer (a type of iPP) synthesized with earlier metal catalysts and with matched molar defect composition. Moreover, the iPPs produced by chain walking showed significantly higher contents of the gamma polymorph than any other iPP or random copolymer with a matched molar defect composition. The formation of higher contents of gamma polymorph is a signature of having shorter crystallizable sequences. Compared with polyolefins synthesized with early metal catalysts, any crystalline polyolefin with chain-walking defects of the type that increase the number of backbone carbons per monomer, will have shorter crystallizable sequences and, as a consequence, lower crystallinity As examples of the novel polyolefins of this invention, the iPPs produced by chain walking exhibited bulky defects made of contiguous defect monomers in controlled contents. The length and content of bulky defects is controlled by reaction temperature and the type of catalyst ligand, as shown in Cherian, A. E.; Rose, J. M; Lobkovsky, E. B.; Coates, G. W. *J. Am. Chem. Soc.* 2005, 127, 13770-13771 and Rose, J. M.; Deplace, F.; Lynd, N. A.; Wang, Z.; Hotta, A.; Lobkovsky, E. B.; Kramer, E. J.; Coates, G. W *Macromolecules* 2008, 41, 9548-9555. The invention relates to the fact that the bulky defects produce a polymer backbone defect microstructure with shorter crystallizable sequences than those found in conventional polyolefins. For a fixed number of monomer units, longer defects produce polymers with shorter crystallizable sequences, and hence lower crystallinities. Lower crystallinities of the homopolymer or copolymer finds applications restricted for conventional polyolefins.

In a preferred embodiment, the synthesized polyolefins have a molecular weight of 30,000-200,000 Da. For example, this range corresponds to approximately 700-5000 monomers in the case of propene. The number of monomers will depend on the type of polyolefin synthesized if the preferred molecular weight range is held constant.

Rac-1α-diimine catalyst (Rac-1) or a cumyl-derived α-diimine catalyst (rac-4) are examples of late metal catalysts that allow chain-walking and polyolefins with reduced crystallinity compared to analog polyolefins synthesized with Ziegler-Natta or earlier metallocene catalysts. More information about these catalysts (used as examples of catalysts leading to chain-walking defects) is found in Cherian, A. E.; Rose, J. M.; Lobkovsky, E. B.; Coates, G. W. *J. Am. Chem. Soc.* 2005, 127, 13770-13771 and Rose, J. M; Deplace, F.; Lynd, N. A.; Wang, Z.; Hotta, A.; Lobkovsky, E. B.; Kramer, E. J.; Coates, G. W *Macromolecules* 2008, 41, 9548-9555.

BRIEF DESCRIPTION OF THE DRAWINGS

For a fuller understanding of the invention, reference should be made to the following detailed description, taken in connection with the accompanying drawings, for the case of iPP as an example of the novel polyolefins in which:

FIG. 5 is a schematic depiction of $^{13}$C NMR assignments of carbons of iPP with chain-walking defects, as example of the novel polyolefins with chain-walking defects, corresponding to sequences of FIG. 3.

FIG. 6 is a schematic depiction of defect composition of Poly(propylenes) with (3,1)-associated regio defects.

FIG. 7 is a schematic depiction of Polymerization Conditions of Poly(propylenes) with (3,1)-associated regio defects.

DETAILED DESCRIPTION OF THE PREFERRED EMBODIMENT

Figure 1:
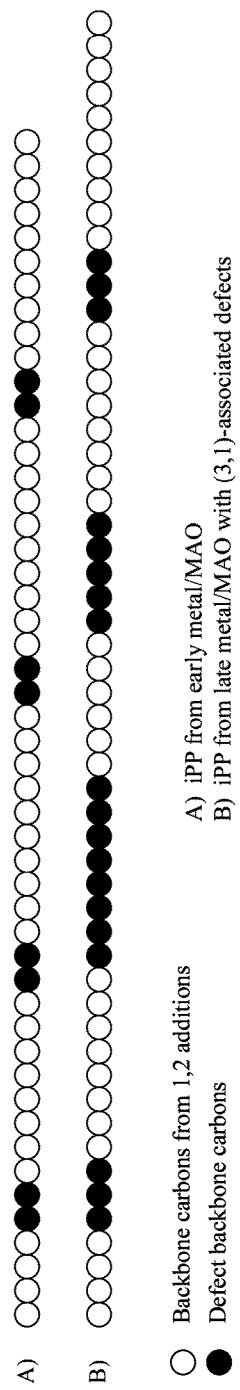
FIG. 1 is a schematic depiction of iPP backbones with defects generated by early metal/MAO catalysts and those found in iPP synthesized by late metal/MAO catalysts compared for an equivalent 25 number of monomers. Critical to the present claim is the reduced sequence length between defects in the latter. Reduced sequence length leads to reduced crystallinity.
Figure 2:
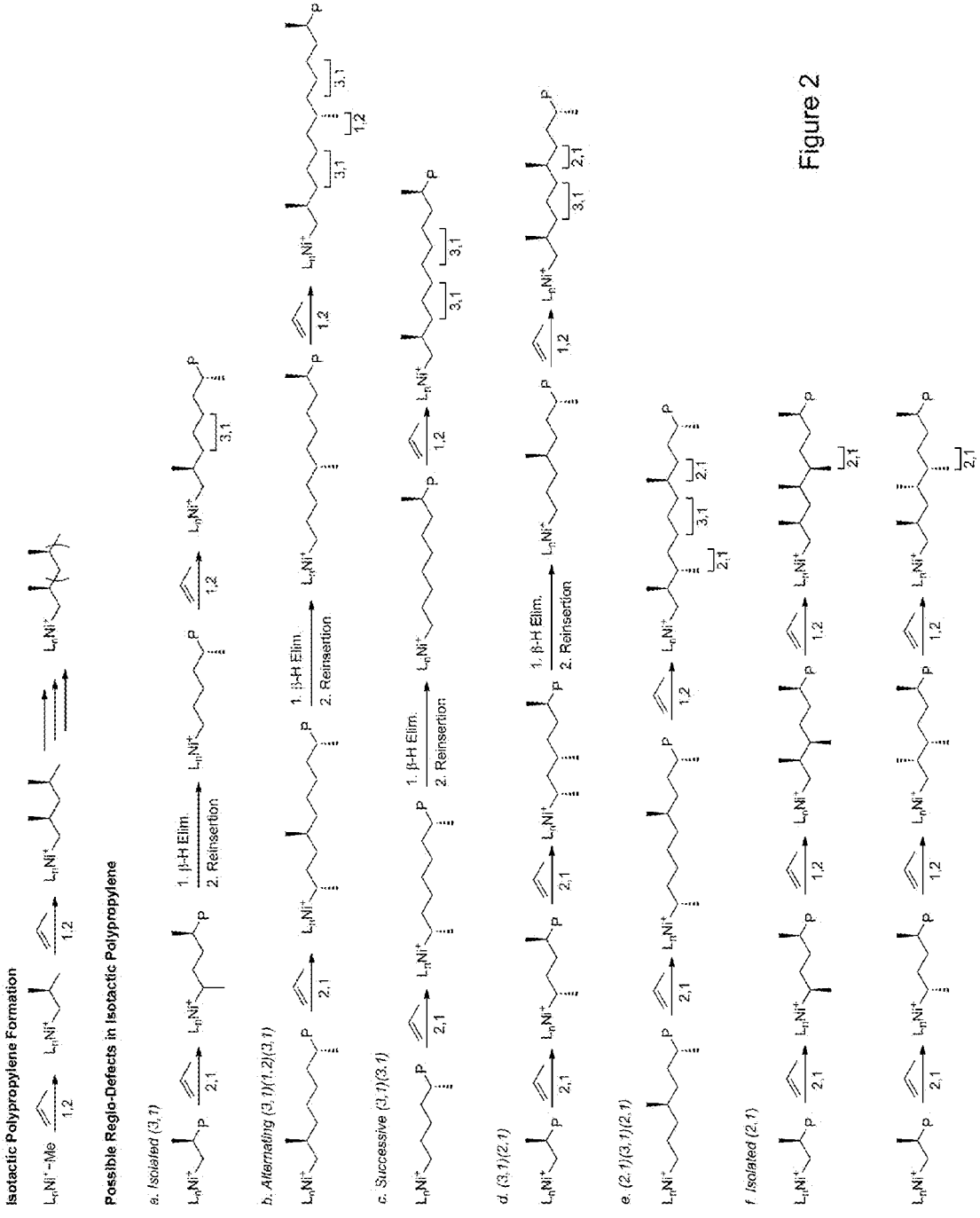
FIG. 2 is a schematic depiction of the mechanism of defect formation by chain walking in Isotactic Polypropylene, as an example.

A chain-walking defect occurs in polyolefins synthesized with living α-diimine Ni(II)-based catalysts when the metal center migrates along the growing polymer chain through a series of β-hydride elimination and reinsertion events. Polyolefins with chain-walking defects may present unique bulky defects. In iPPs for example, there may be an isolated (3,1) enchainment, alternating (3,1) and (1,2) enchainments, isolated diads or triads (3,1) enchainments, or such enchainments followed or preceded by (2,1) inversions. In addition, tacticity errors or isolated (2,1) inversions may also be present; the latter occur when a (2,1) inversion resists (3,1) enchainment. A large variety of well-defined bulky defect structures are possible under otherwise controlled conditions by changing the reaction temperature. For example, the mechanism of formation of these regio defect structures in iPP is summarized in FIG. 2. Chain-walking enchainments of a similar nature may be found in the polymerization of isotactic 1-pentene, and other olefins producing continuous methylene sequences in the backbone with five or more carbons. Here, any defect sequence of any length that exhibits chain-walking enchainments is named a chain-walking associated defect.

Figure 3:
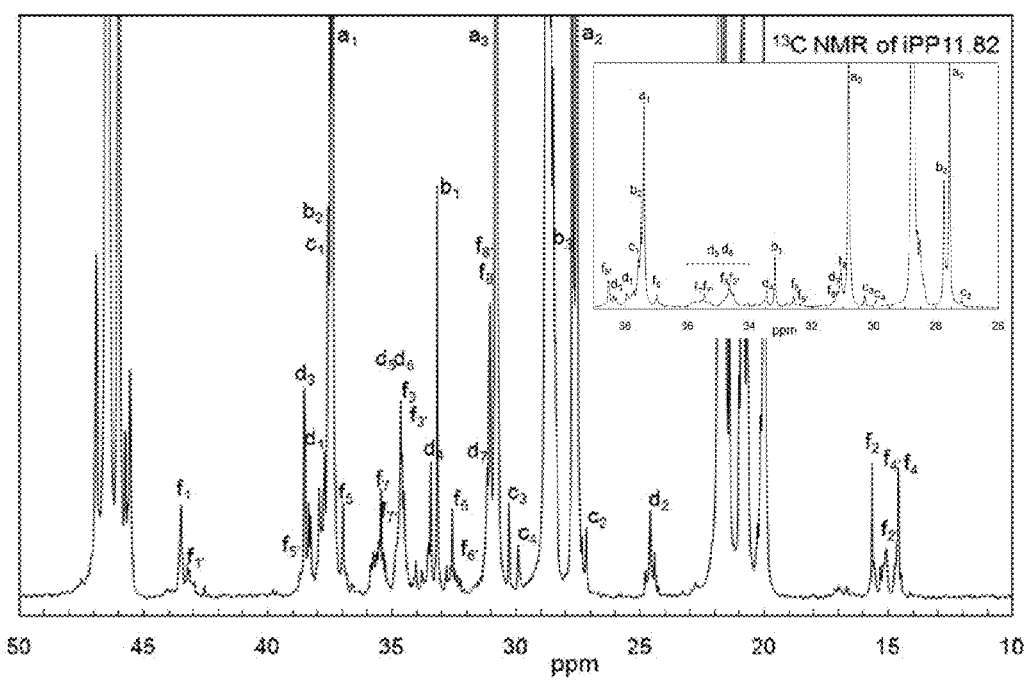
FIG. 3 is a schematic depiction of $^{13}$C NMR spectrum of iPP 11.82 as an example. The 26-39 ppm region is expanded in the inset.
Figure 4:
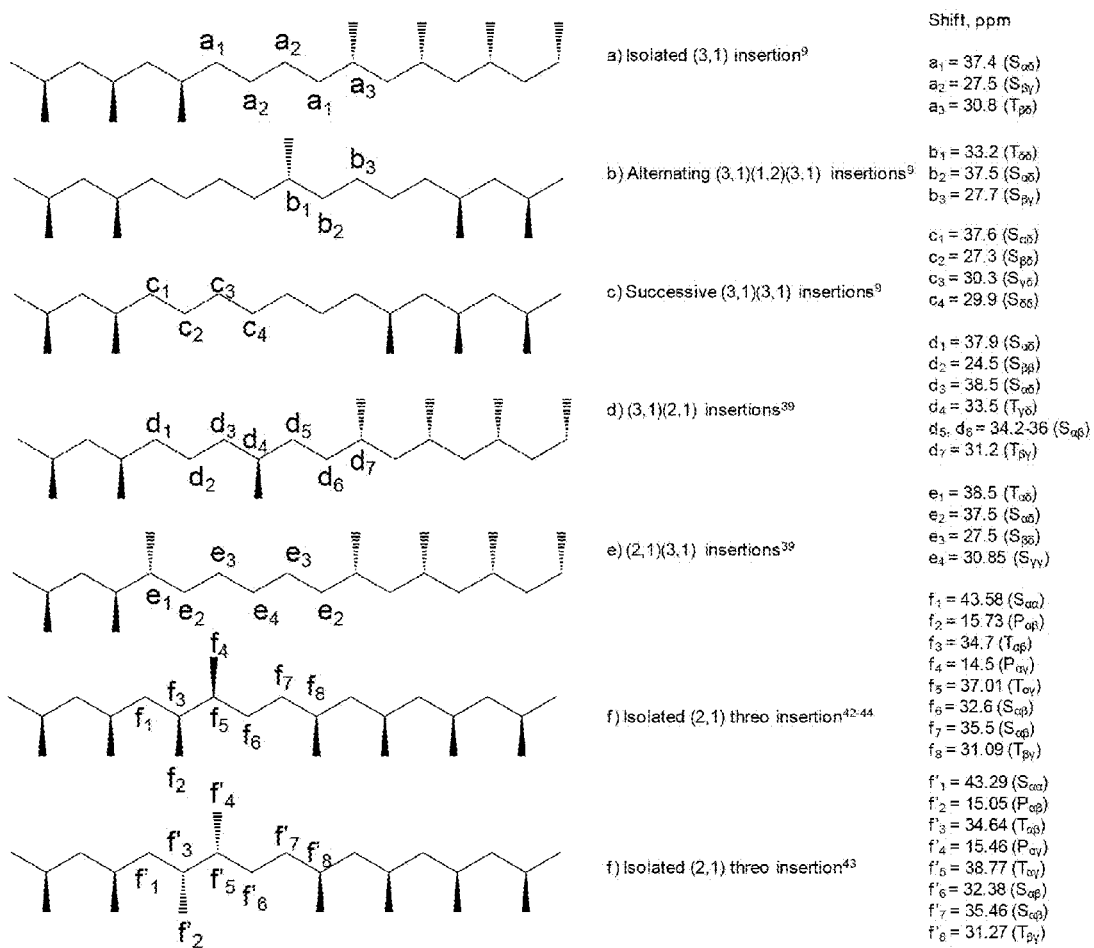
FIG. 4 is a schematic depiction of letter designations for pertinent chain defect structures and their $^{13}$C NMR peak assignments for iPP as an example of the novel polyolefins. Note that with respect to the growing chain, and in accordance with scheme 1, consecutive "errors" are listed beginning with the last and ending with the first erroneous insertion.

As an example of characteristics of the novel polyolefins, a $^{13}$C NMR study of PPs synthesized with C2-symmetric, living α-diimine Ni(II) catalysts rac-1 and rac-4 revealed that both catalysts insert the same types of defects (FIG. 3). The structures corresponding to (3,1)-associated defected sequences and (2,1) threo inversions are shown in FIG. 4. Here, with respect to the growing chain (chain growth from right to left), consecutive "errors" are listed beginning with the last and ending with the first erroneous insertion. Resonances for the indicated carbons in these structures are listed in FIG. 5. Each carbon type is designated according to the terminology given by Carman et al. (Carman C. J.; Harrington R. A.; Wilkes C. E. *Macromolecules* 1977, 10, 536-544) where S, T and P refer to secondary (methylene), tertiary (methine) and primary (methyl) carbons respectively, and the Greek subscripts refer to the distance a given carbon is from a neighboring branched methane.

Isolated (3,1) insertions, or defects of type (a), are characterized by resonances corresponding to methylenes, $S_{\alpha\delta}$ (a1=37.4) ppm and $S_{\beta\gamma}\alpha$(a2=27.5 ppm), and methane, $T_{\beta\delta}$ (a3=30.8 ppm). The best resolved resonance corresponding to the alternating (3,1)(1,2)(3,1) insertion, or defect of type (b), is methine $T_{\delta\delta}$ (b1=33.2 ppm). Successive (3,1)(3,1) insertions, or defects of type (c), introduce seven adjacent methylenes in the backbone with three clearly identifiable resonances in NMR spectra, $S_{\beta\delta}$ (c2=27.3 ppm), $S_{\gamma\delta}$ (c3=30.3 ppm) and $S_{\delta\delta}$ (c4=29.9 ppm). The resonance at 24.5 ppm has been associated with Sββ from a sequence of three adjacent methylenes. Such a sequence is generated in defects of type (d), or . . . (1,2)(3,1)(2,1)(1,2) . . . additions that occur when the second of two consecutive (2,1) inversions is isomerized. The reverse possibility, a defect of type (e), is also plausible and was included in the schemes given by McCord et al. (see McCord, E. F.; McLain, S. J.; Nelson, L. T. J.; Arthur, S. D.; Coughlin, E. B.; Ittel, S. D.; Johnson, L. K.; Tempel, D.; Killian, C. M.; Brookhart, M. *Macromolecules* 2001, 34, 362-371). This type (e) defect appears absent in iPP made with catalysts Rac-1 and rac-4. Isolated (2,1) threo additions of two conformational diastereoisomeric forms [defects of types (f) and (f')] are also found in the region 14-16 ppm. The content of erythro (2,1) inversions, if any, is negligible since basically no resonances were found in the 17-18 ppm and 42 ppm regions in any of the spectra.

The content of each type of defected sequence is calculated from the averaged intensity of carbons that belong to a specific defect over the total propylene molar intensity (TPI).

$$TPI = I(CH_3) + S_{\beta\gamma}(a_2)/2 + 2*T_{\delta\delta} + [(S_{\delta\delta} + S_{\gamma\delta})/3 + S_{\gamma\delta}/2)] + S_{\beta\beta} + (P_{\alpha\beta} + P_{\alpha\gamma})/2 \quad [1]$$

In Equation [1], I(CH3) corresponds to the NMR signal intensity in the methyl region (area from 19 to 23.5 ppm). Enchained monomer units free of the methyl group are also added to compute the total monomer intensity. These are the isolated (3,1) defect (added as a2/2); the two (3,1) units of the alternating (3,1)(1,2)(3,1) defect, because the CH3 of the middle unit is included in the I(CH3) region; the resonances of two units from the (3,1)(3,1) successive insertions; the (3,1) unit from the (3,1)(2,1) additions and the isolated (2,1) defects have chemicals shift in the 14-16 ppm region and are therefore outside the I(CH3) area.

Accordingly, the molar fraction of each type of defected sequence over all monomer units is given as:

$$\text{Isolated 3,1-insertion} = \frac{S_{\beta\gamma}/2}{TPI} = \frac{a_2/2}{TPI} \quad [2]$$

In Equation [2], only the resonance of the central methylenes are considered to contribute to isolated (3,1) insertions. This is due to overlapping of a1 carbons with other resonances, and the lack of resolution between methines that flank $\geq 4$ consecutive methylenes ($T_{\beta\delta}$).

$$\text{Alternating}(3,1)(1,2)(3,1) \text{ insertions} = \frac{T_{\delta\delta}}{TPI} = \frac{b_1}{TPI} \quad [3]$$

$$\text{Successive}(3,1)(3,1) \text{ insertions} = \frac{(S_{\gamma\delta})/2}{TPI} = \frac{(c_3)/2}{TPI} \quad [4]$$

$$(3,1)(2,1) \text{insertions} = \frac{S_{\beta\beta}}{TPI} = \frac{d_2}{TPI} \quad [5]$$

$$\text{Isolated 2,1 threo insertions} = \frac{(I_{14-16\,ppm})/2}{TPI} = \frac{(f_2 + f_4 + f_{2'} + f_{4'})/2}{TPI} \quad [6]$$

$$\text{Stereo} = \frac{I_{21.05}/2}{TPI} \quad [7]$$

For all iPPs, $S_{\delta\delta}/S_{\gamma\delta}$ was close to 2, indicating a low probability of successive (3,1) insertions longer than two. The molar composition of each type of defect, based on polymers 100 monomers long, is shown in FIG. 6 for the two series of iPPs studied.

Figure 8:
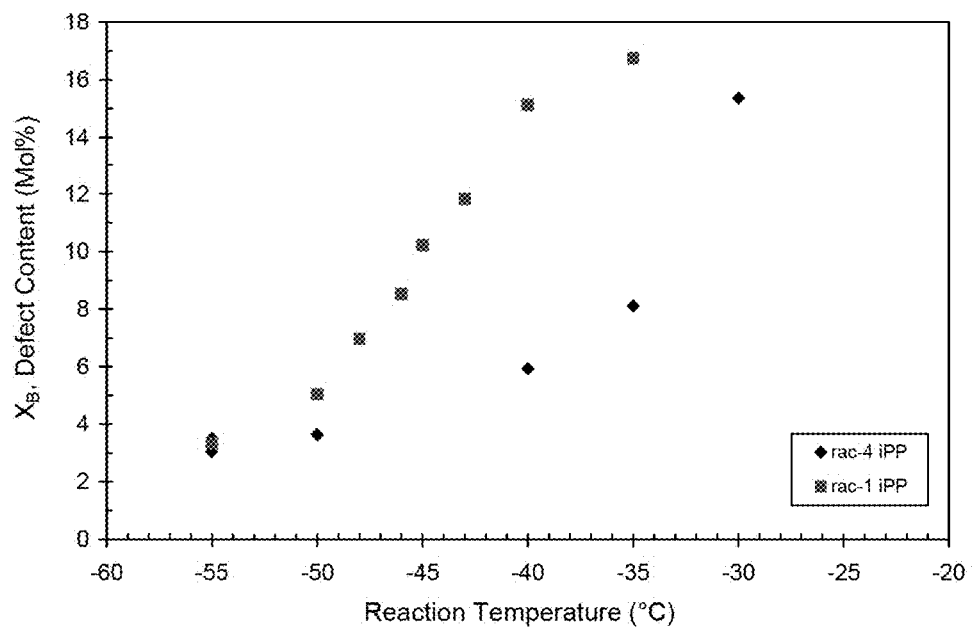
FIG. 8 is a schematic depiction of the effect of polymerization temperature on total defect content (mol %) in iPPs synthesized with Ni(II) catalysts with different ligands are used as examples of the novel polyolefins.

The regiochemistry of iPPs with chain walking defects shows interesting catalyst-type dependence. FIG. 7 shows an increase in molecular weight for an increase in reaction temperature. This indicates enhanced catalytic activity with temperature. A progressive increase in the total defect content is evident as temperature increases for both catalysts. There are, however, large differences in the content of defects generated by each catalyst at a fixed temperature (FIG. 8). At the lowest temperatures, $\leqq -50°$ C., both catalysts insert about the same low level of defects, whereas $\geqq -50°$ C. the cumyl-derived catalyst (rac-4) is more isoselective, inserting many fewer defects than rac-1. The difference in the content of defects generated remains if the content of defective monomers is evaluated vs. reaction temperature instead of defects of types (a-f).

Figure 9:
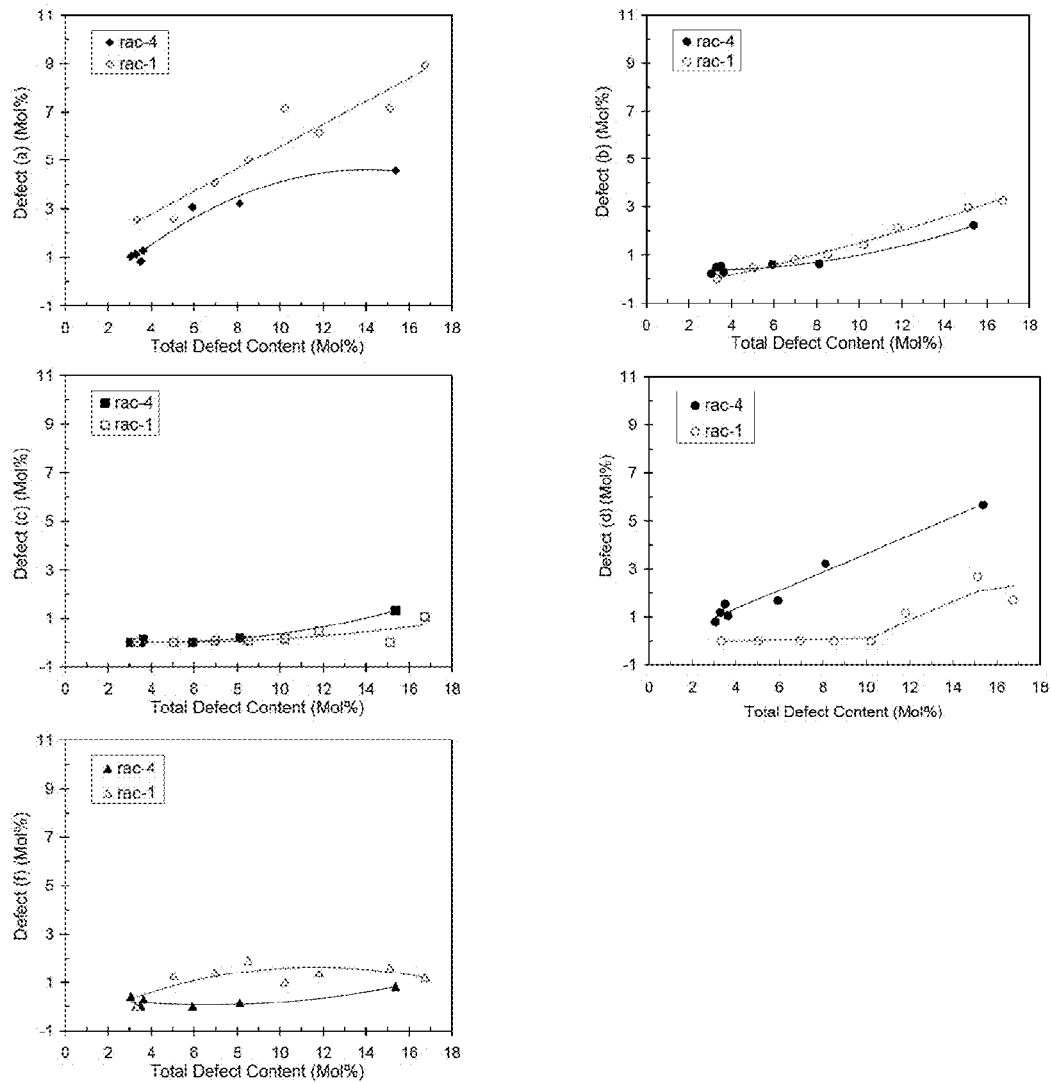
FIG. 9 is a schematic depiction of the content of specific type of defect vs. total defect content (mol %) for iPPs synthesized with rac-1 and rac-4 catalysts.

Differences in the activity of each catalyst with respect to the insertion of a particular type of defect are analyzed in FIG. 9. The content of each type of defect for both catalysts is plotted over the total defect content. The variation in defects (b), (c) and (f) is similar for both catalysts. The major differences are found for defects (a) and (d). For a fixed overall defect content, iPPs synthesized with rac-1 contain more isolated (3,1) enchainments and have negligible amounts of defects of type d. By contrast, iPPs synthesized with rac-4 have a very large number of defects of type d, about 35% of all defects in these iPPs. Therefore, since the rate of iPP polymerization by rac-4 is high, fewer (2,1) defects are generated, and those generated have less time to undergo isomerization to (3,1). A subsequent (2,1) unit can then be added with high probability to undergo (3,1) enchainment, producing a defect of type d. On average, runs of continuous isotactic sequences in rac-4 iPPs are shorter than in rac-1 iPPs because of the greater content of defects of type d in rac-4 iPPs.

Figure 10:
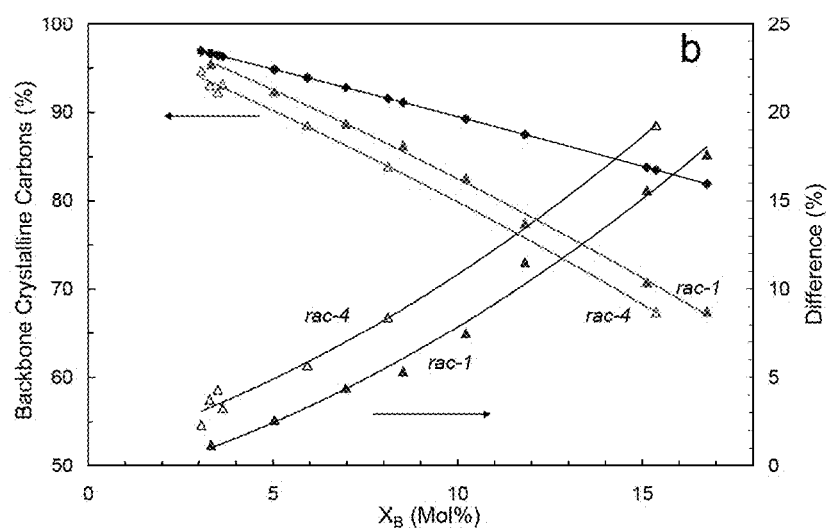
FIG. 10 is a schematic depiction of percentage backbone crystalline carbons (out of 100 backbone carbons) for (3,1) iPPs of FIG. 6 (squares and triangles) and for analogs control iPPs with (2,1) defects (diamonds). Right scale y shows percentage difference between backbone crystalline carbons for (3,1) iPPs and iPP control. The crystallizable sequence length is reduced in polyolefins synthesized with rac-4, and their crystallinity levels are more depressed.

A difference in length and number of backbone crystalline carbons is found between rac-1 and rac-4 catalysts. While rac-4 is a more efficient catalyst than rac-1 to polymerize iPP, (rac-4 produces higher molar mass iPPs at the same reaction temperature and time), on average, the defects generated by rac-4 lead to shorter crystallizable sequence lengths compared to those generated by rac-1 (FIG. 10).

Melting Temperatures

Figure 11:
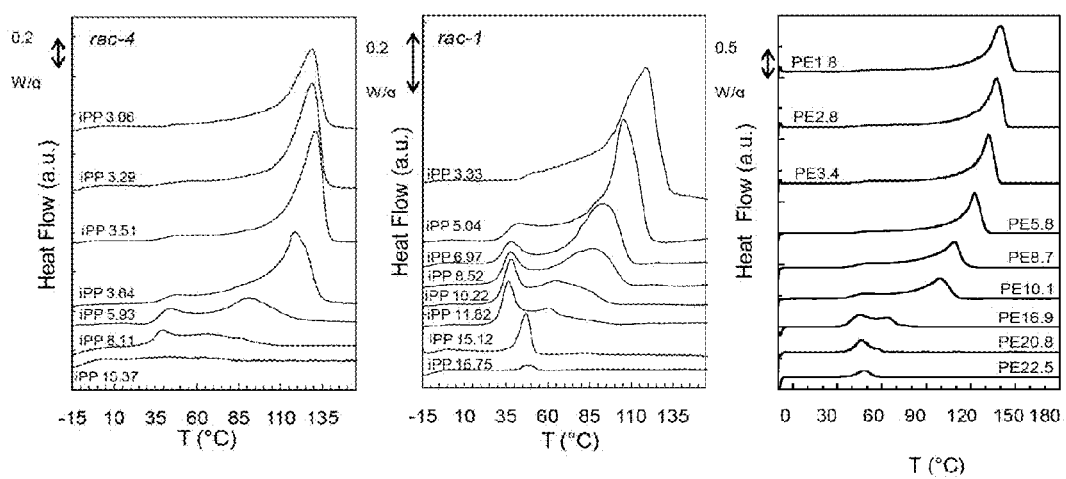
FIG. 11 is a schematic depiction of DSC endotherms of samples melt crystallized at ambient temperature (23±2° C.), and kept at RT for ~2 weeks.

The influence of the concentration of total defects on the melting behavior was determined by DSC on specimens that were melt-pressed and kept at room temperature for about two weeks. FIG. 11 shows the endotherms for both (3,1) iPP series compared with the endotherms of propylene ethylene random copolymers (PE) in the same defect range, synthesized with a metallocene catalyst in a prior work. A direct comparison with PEs is first made due to the similarity of the chain-walking effect, at least apparently, to the addition of ethylene units. Both add ethylene runs to the backbone. Furthermore, the addition by a metallocene catalyst of the ethylene unit and by the living catalyst of the (3,1) enchainment are expected to follow random statistics consistent with a site-control polymerization. Thus, (3,1) iPPs can be treated as random copolymers where the a, b, c, d, f and stereo defects are co-units disrupting the isotactic chain regularity as do the ethylene units in the PE copolymer. Comparing the shape of the endotherms of FIG. 11, It was concluded that except for a more pronounced aging (indicated by a melting peak at ~40° C.), and the presence of a middle additional shoulder in the lower defect range of rac-4 iPPs, the melting traces of (3,1) iPPs and PEs are very similar.

The major difference with PEs are lower melting temperatures and more prominent aging peaks in (3,1) iPPs, all indicative of less crystalline materials than PEs at equivalent defect composition.

Figure 12:
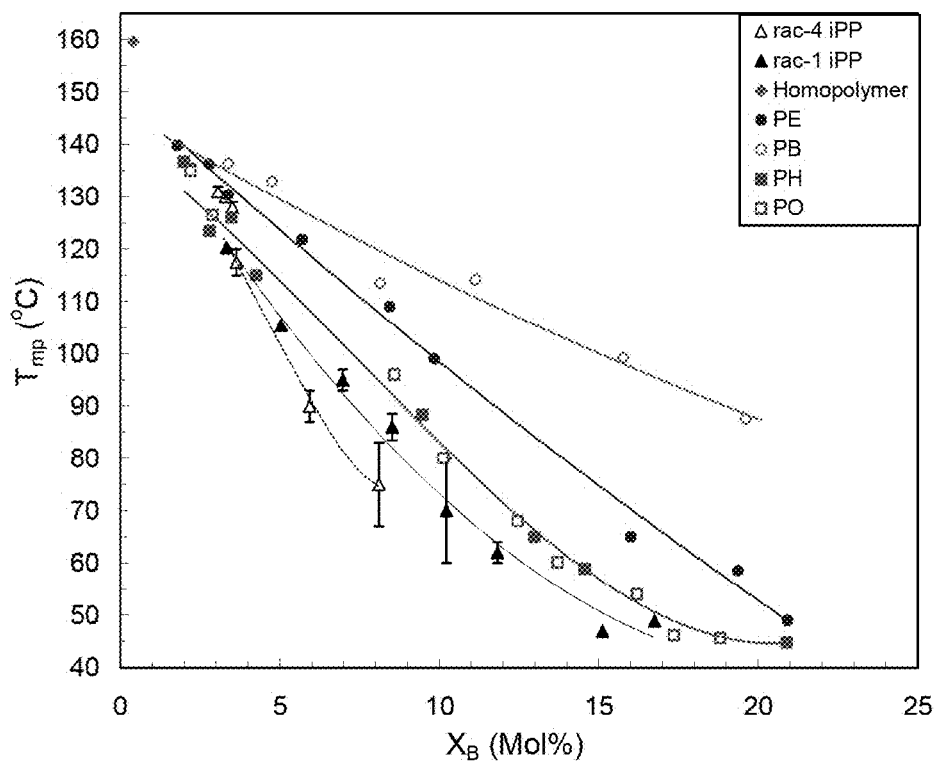
FIG. 12 is a schematic depiction of melting temperature—defect composition relations for random propylene 1-alkene copolymers, and for iPPs with chain-walking defects (black symbols). Data for copolymers from K. Jeon, H. Palza, R. Quijada, R. G. Alamo, *Polymer,* 2009, 50, 832. Earlier metallocene-made homopolymer is also added (diamond). The continuous and discontinuous lines are added only as guides of the variation of experimental data.

The peak melting temperatures (Tmp)—composition relations of (3,1) iPPs are comparatively shown in FIG. 12 with data for random propene 1-alkene copolymers. For a direct comparison, the evaluation is carried out on the basis of point defects ($X_B$), defined as a single defect monomer or a multi-monomer defect run bonded on either side by non-defect monomer runs, over the total monomer units. Here, in addition of PEs, data for propylene 1-butene (PB), propylene 1-hexene (PH) and propylene 1-octene (PO) are also shown. The data for copolymers are from Jeon K, Chiari Y L, Alamo R G. *Macromolecules* 2008; 41:95-108 and from K. Jeon, H. Palza, R. Quijada, R. G. Alamo, Polymer, 2009, 50, 832. Prior to melting all copolymers were subjected to the same thermal history as for (3,1) iPPs. Differences in melting temperatures among the copolymers at a fixed composition are known to be due to differences in the partitioning of the co-unit between crystalline and non-crystalline regions. PBs melt at the highest temperatures because the comonomer participates in the crystallites at the highest content, thus, their crystallizable sequences are the longest. The ethylene unit is also able to co-crystallize with the propylene units, but at a lower extent than is the 1-butene co-unit; hence, the PE melting temperatures are lower than PBs, yet they are higher than for matched PHs and POs. Since the co-units of all POs and PHs with <13 mol % 1-hexene are rejected from the crystallites, their crystallizable sequences are shorter, and their melting temperatures significantly lower. Rac-1 and rac-4 iPP melt at lower temperatures than copolymer due to their shorter crystallizable sequences. The difference in melting increases with increasing concentration of (3,1) defects.

Degree of Crystallinity

Figure 13:
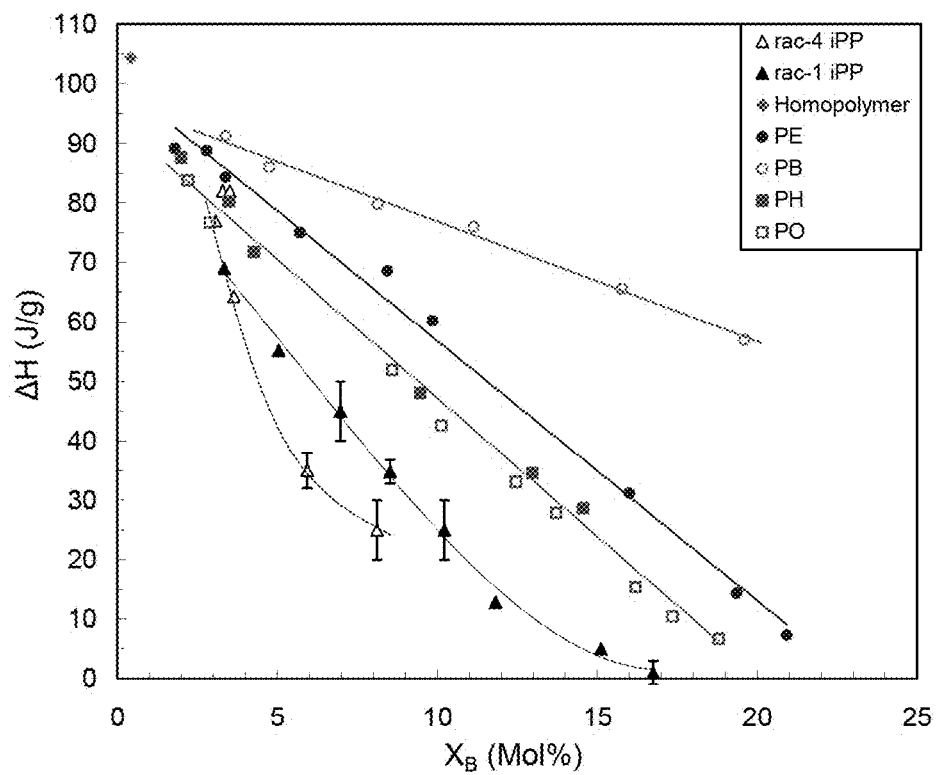
FIG. 13 is a schematic depiction of heat flow—defect composition relations for random propylene 1-alkene copolymers, and for iPPs with chain-walking defects, as for FIG. 12. The continuous lines are added only as guides of the variation of experimental data.

FIG. 13 provides an analysis of the variation of the heat of fusion of (3,1) iPPs in a conventional plot where the x axis is $X_B$ (moles of point defects per 100 moles of mononer units). The data for random 1-alkene copolymers from K. Jeon, H. Palza, R. Quijada, R. G. Alamo, Polymer, 2009, 50, 832 are also shown comparatively. At a fixed $X_B$ content it is found in FIG. 13 the same variation of $\Delta H$ with type of co-unit as found for Tmp in FIG. 12. PB and PE exhibit higher heat of fusion due to the accommodation of the co-units in the crystallites and the concomitantly large concentration of crystalline sequences that participate in the crystallization process. Clearly, (3,1) iPPs lose crystallinity at a much greater rate than PO or PHs with matched defect composition.

Figure 14:
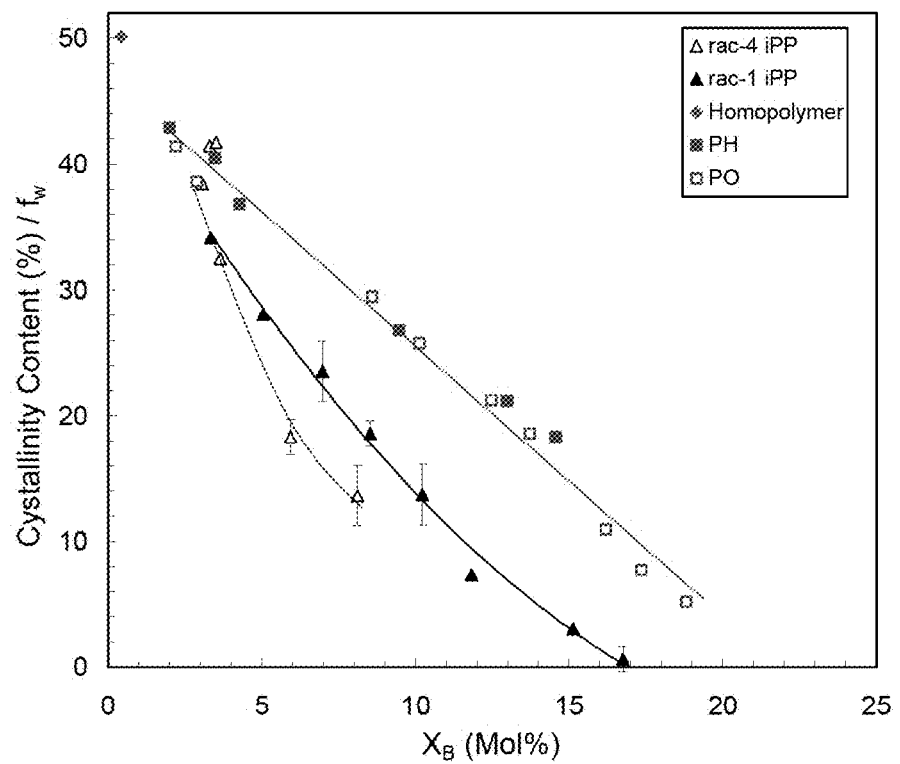
FIG. 14 is a schematic depiction of DSC crystallinity normalized by weight fraction of crystalline monomers vs. defect composition relations for random propylene 1-alkene copolymers, and for iPPs with chain-walking defects. The continuous lines are added only as guides of the variation of experimental data.

The impact of the (3,1) units on crystallinity calculated from the heat of fusion ($\Delta H/209$) is displayed comparatively with values for PH and PO copolymers in FIG. 14; thus, the behavior of co-units rejected from the crystalline regions are directly compared. Here, the DSC-based weight fraction crystallinity values are normalized by the weight fraction of crystalline units (fw) to account for the difference in weight of the 1-hexene and 1-octene co-units and the (a)-(f) defect units. Clearly, even after this normalization, a large difference in crystallinity remains. For example, crystallinity drops from 0.40 to about 0.35 at the lowest defect content, and decreases from 0.19 for PO to ~0.03 in (3,1) iPPs at a 14 mol % defect level, or 85% decrease in crystallinity.

Figure 15:
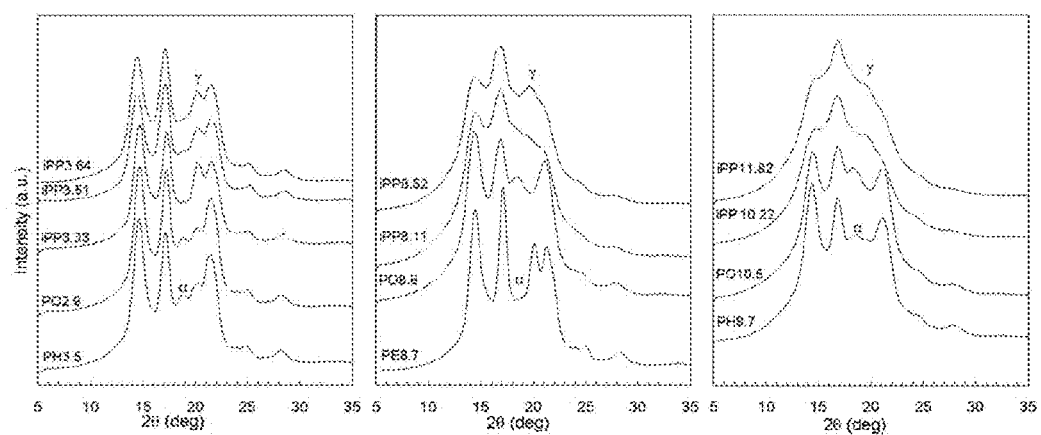
FIG. 15 is a schematic depiction of WAXD diffractograms of iPP and 1-alkene copolymers slowly cooled from the melt to ambient temperature. Diffractograms are shown at comparative defect levels of ~3.5 mol %, 8.5 mol % and ~10.5 mol %.
Figure 16:
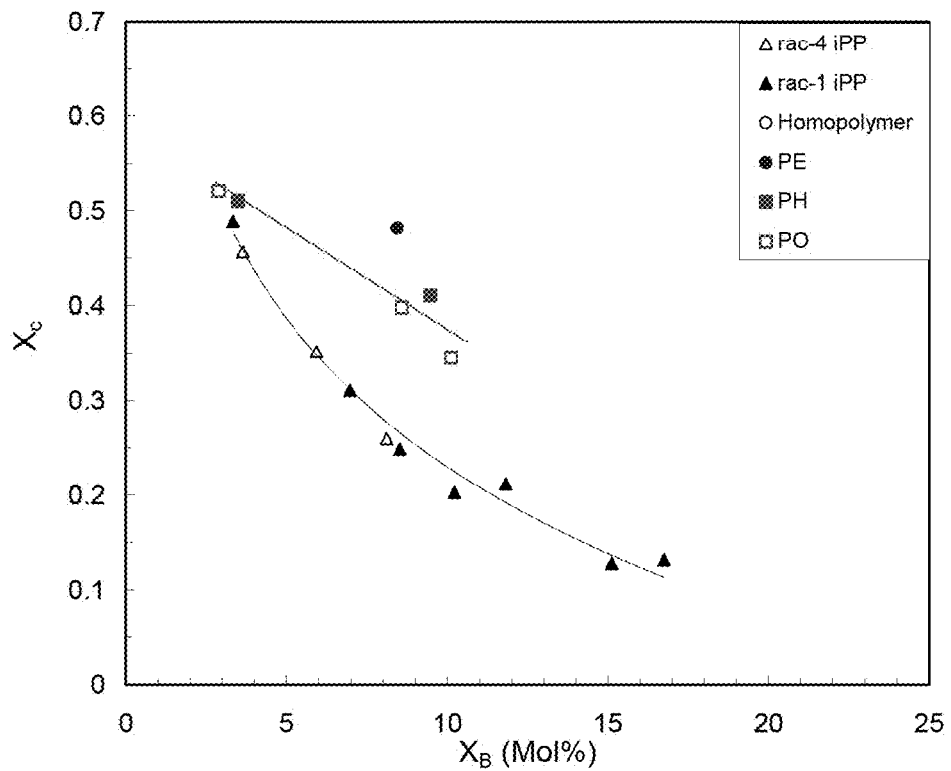
FIG. 16 is a schematic depiction of the degree of crystallinity calculated from WAXD as a function of the total defect content (mol %) for iPPs with chain-walking defects and 1-alkene copolymers.

Further evidence of the drastic decrease of crystallinity level of (3,1) iPPs in reference to copolymers with non-crystallizable co-units was obtained from crystallinities derived from WAXD patterns. Selected sets with about the same defect content in a range of ~3, ~8 and ~10 mol % were comparatively studied. The WAXD patterns are shown in FIG. 15 for samples that were slowly cooled from the melt to ambient temperature at ~2° C./min. In addition to evidences from the WAXD patterns for lower crystallinity of (3,1) iPPs compared to PO and PH, especially at the ~10 mol % defects, there are also differences in polymorphic behavior within each set. The crystallinity levels obtained after subtraction of the amorphous pattern are given in FIG. 16. A large crystallinity decrease with respect to values of PH and PO copolymers remains, similarly as found for DSC crystallinities. (3,1) iPPs develop about half of the copolymer's crystallinity at ≧10 mol % defects.

Polymorphism and Crystallite Thicknesses

Extensive studies of iPPs and random 1-alkene copolymers synthesized with metallocene catalysts have demonstrated that the presence of defects in the iPP chain favor the formation of the γ (orthorhombic) polymorph over the more common a (monoclinic) phase. Polypropylenes with increasing defects randomly distributed have shortened crystallizable sequences and develop higher contents of the γ phase. Random iPP copolymers with co-units excluded from the crystal lattice, such as PH (<13 mol %) and PO copolymers, have the same average length of crystallizable sequences, hence, they develop the same content of γ phase. It is also known that the γ phase is favored at higher crystallization temperatures (see for example, Alamo R G, Kim M-H, Galante M J, Isasi J R, Mandelkern L. *Macromolecules* 1999; 32:4050-64. Hosier I L, Alamo R G, Esteso P, Isasi J R, Mandelkern L. *Macromolecules* 2003; 36:5623-36. De Rosa et al. *Macromolecuels* 2002, 35, 3622, De Rosa C, Auriemma F, Ruiz de Ballesteros O, Resconi L, Camurati I. *Chem Mater* 2007; 19:5122-30).

For homopolymers, and random copolymers it was found that the maximum content of gamma crystals scales inversely proportional to the log of the average length of isotactic sequences (Niso). Since Niso for (3,1) iPPs is lower than for matched random PO and PH copolymers, it is of interest to test if (3,1) iPPs form higher contents of gamma crystals as expected. For these comparative polymorphic studies, the inventors focus on isothermally crystallized rac-1 (3,1) iPPs. With increasing crystallization temperature, the content of gamma phase is compared with data for propylene ethylene copolymers in FIG. 17 and with data for PO and PH copolymers in FIG. 18. In the figure, the data for the copolymers are indicated as discontinuous lines in the figures, and the symbols are data for rac-1 iPPs. Clearly, in the whole range of defect concentration, (3,1) iPPs develop much higher contents of gamma phase than any 1-alkene random copolymer with a matched defect content.

Figure 17:
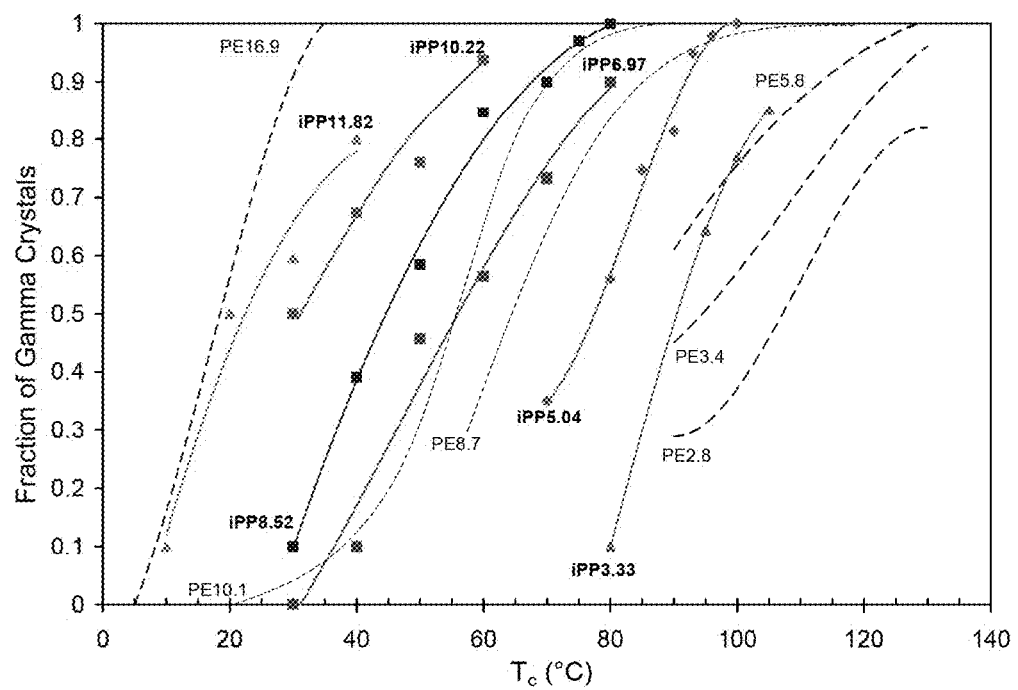
FIG. 17 is a schematic depiction of the content of crystal in the gamma phase developed as a function of increasing isothermal crystallization temperature. Dashed lines for propylene ethylene (PE) copolymers (from K. Jeon, H. Palza, R. Quijada, R. G. Alamo, *Polymer,* 2009, 50, 832) and solid lines data for (3,1) iPP.
Figure 18:
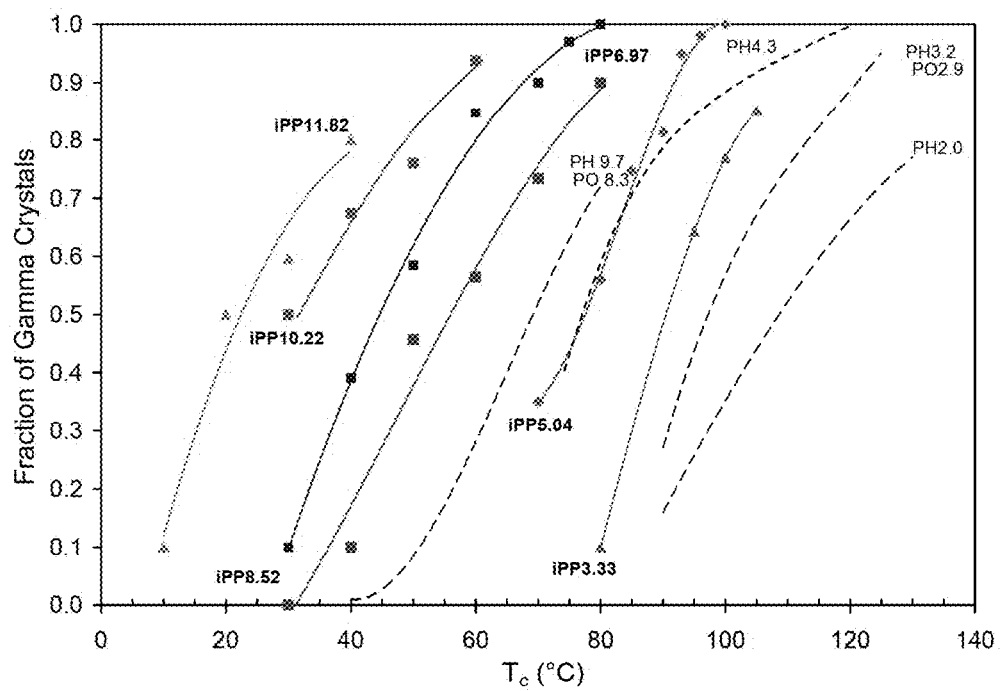
FIG. 18 is a schematic depiction of the content of crystal in the gamma phase developed as a function of increasing isothermal crystallization temperature. Dashed lines, propylene 1-hexene (PH), and propylene 1-octene (PO) copolymers (from K. Jeon, H. Palza, R. Quijada, R. G. Alamo, *Polymer,* 2009, 50, 832), solid lines data for (3,1) iPPs.

Due to the partial accommodation of the ethylene monomer in the crystal, the crystallizable sequence lengths of matched PEs are longer than for (3,1) iPPs, hence, the large difference in gamma content with the behavior of PEs in FIG. 17 is expected. Furthermore, FIG. 18 gives evidence for the fact that (3,1) iPPs also develop higher contents of gamma phase than PH and POs regardless of the exclusion of the co-units (comonomer or chain-walking defects) from the crystallites. This behavior points out that not only have (3,1) iPPs shortened crystallizable sequences than PEs, but the isotactic sequence lengths of (3,1) iPPs are also shorter than for PH and PO copolymers with matched defect composition.

Figure 19:
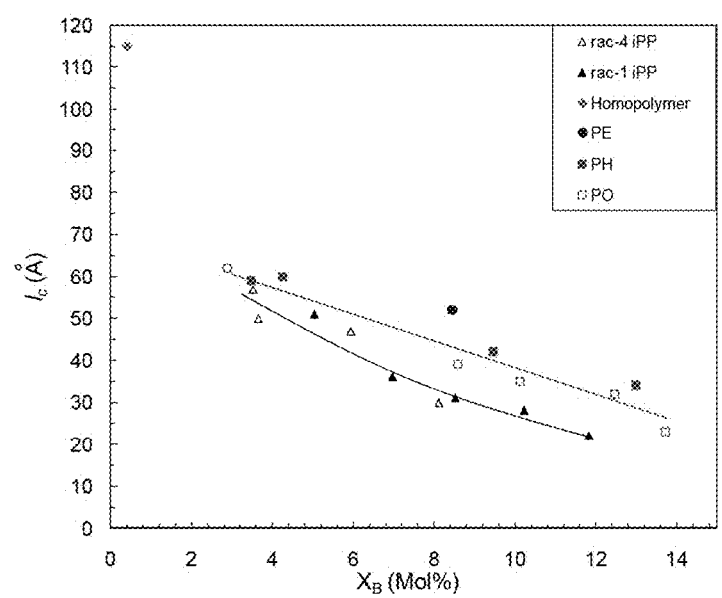
FIG. 19 is a schematic depiction of crystallite thicknesses as a function of the total defect content (mol %) for iPPs with chain-walking defects and propylene/1-alkene copolymers.

Crystallite thicknesses obtained from SAXS long periods corrected with the crystallinity fraction derived by WAXS, are given in FIG. 19 for slowly cooled specimens. Below ~4 mol %, the crystallite thicknesses are very similar, however, the influence of blocky defects and the extra backbone carbon from (3,1) insertions displaces the crystallite thicknesses to increasingly thinner values as the overall content of chain-walking defects increases. Hence, the reduction of the crystallizable sequence length in iPPs with chain walking, compared to matched random copolymers, affects crystallite thicknesses in a manner that follows the decrease of melting points measured by DSC.

EXAMPLES OF SYNTHESIS METHODOLOGIES AND CHARACTERIZATION TECHNIQUES

Example I

Poly(propylene) Synthesis

The diimine-based catalysts used to make the two series of poly(propylenes) analyzed, rac1 and rac 4.

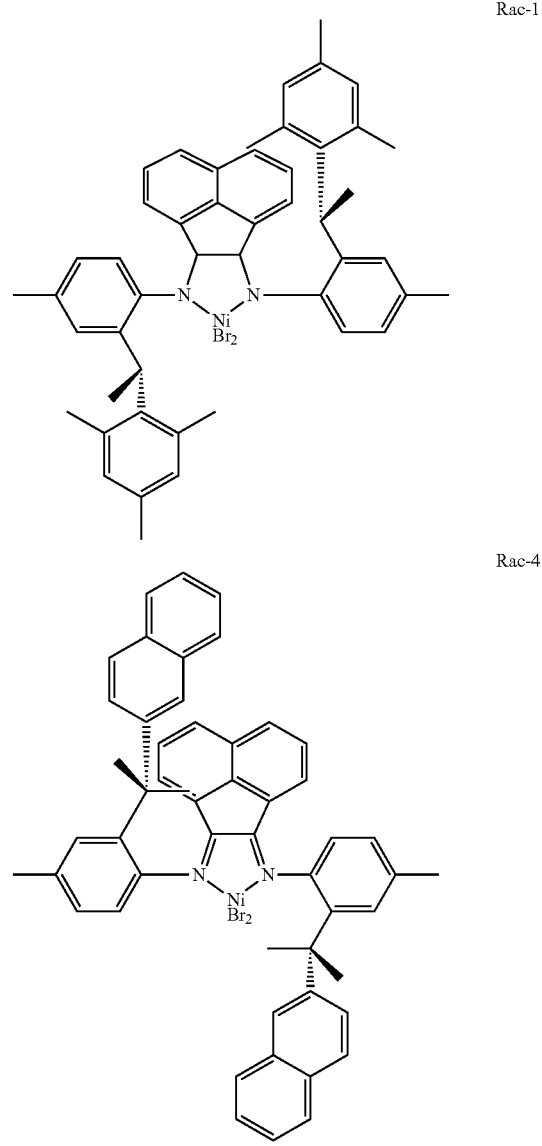

Example II

Propylene Polymerization, FIG. 6, Entry 6-10

In a glovebox, a 6 ounce (180 mL) round-bottom Laboratory Crest reaction vessel (Andrews Glass) was charged with toluene (25 mL) and a solution of MMAO-7 (2.4 mL, 4.6 mmol). The solution was cooled to −78° C. and the appropriate mass of propylene was condensed into the vessel. The reaction mixture was then allowed to equilibrate to the desired temperature. After 10 minutes, the complex (17 μmol) was injected as a solution in 2 mL of dry, degassed CH2Cl2. The polymerization was quenched with methanol (10 mL). The reaction mixture was then precipitated into copious acidic methanol (5% HCl(aq)) and the resulting suspension stirred overnight. The polymer was isolated, dissolved in hot toluene, filtered over celite/silica/alumina, precipitated with methanol, isolated again and dried to constant weight in vacuo at 60° C.

Example III

Propylene Polymerization, FIG. 6, Entries 4 and 5

In a glovebox, a 6 ounce (180 mL) round-bottom Laboratory Crest reaction vessel (Andrews Glass) was charged with toluene (25 mL) and a solution of MMAO-7 (2.4 mL, 4.6 mmol). The solution was cooled to −78° C. and propylene (15 g) was condensed into the vessel. The reaction mixture was then allowed to equilibrate to −55° C. After 10 minutes, complex 3 (0.016 g, 17 μmol) was injected as a solution in 2 mL of dry, degassed CH2Cl2. An aliquot was taken from the reaction mixture via canula using an overpressure of 30 psig propylene after 6 hours. The polymerization was quenched with methanol (10 mL) after 48 hours. Both the aliquot and the final reaction mixture were precipitated into copious acidic methanol (5% HCl(aq)) and the resulting suspensions stirred overnight. Both polymers were isolated, dissolved in hot toluene, filtered over celite/silica/alumina, precipitated with methanol, isolated again and dried to constant weight in vacuo at 60° Ç.

Example IV

Propylene Polymerization, FIG. 6, Entries 11-18

In a glovebox, a 6 ounce (180 mL) round-bottom Laboratory Crest reaction vessel (Andrews Glass) was charged with toluene (25 mL) and a solution of MMAO-3A (2.5 mL, 4.6 mmol). The solution was cooled to −78° C. and an appropriate mass of propylene was condensed into the vessel. The reaction mixture was then allowed to equilibrate to the desired temperature. After 10 minutes, complex 5 (0.018 g, 17 μmol) was injected as a solution in 2 mL of dry, degassed CH2Cl2. The polymerization was quenched with methanol (10 mL). The reaction mixture was then precipitated into copious acidic methanol (5% HCl(aq)) and the resulting suspension stirred overnight. The polymer was isolated, dissolved in hot toluene, filtered over celite/silica/alumina, precipitated with methanol, isolated again and dried to constant weight in vacuo at 60° C.

Characterization Techniques.

$^1$H and $^{13}$C NMR spectra of polymers were recorded using a Varian UnityInova (600 MHz) spectrometer equipped with a 10 mm broadband probe operating at 135° C. and referenced versus residual non-deuterated solvent shifts. The polymer samples were dissolved in 1,1,2,2-tetrachloroethane-d2 (10 wt %) in a 5 mm O.D. tube, and spectra were collected at 135° C. For quantitative proton decoupled $^{13}$C analysis, the spectra were collected either in the same Varian UnityInova (600 MHz) spectrometer with inverse gated decoupling using the TYCO-25 decoupling sequence, a 30° excitation pulse width, 2.0 s acquisition time, and 30s relaxation delay. Selected iPPs were also recorded at 120° C. in a 10 mm probe using a Varian spectrometer with a frequency of 700 MHz on 1H. The conditions to obtain the latest spectra were as follows, a 90 degree pulse, an acquisition time adjusted to give a digital resolution between 0.1 and 0.12 Hz, at least a 10 second pulse acquisition delay time with continuous broadband proton decoupling using swept square wave modulation without gating during the entire acquisition period. The spectra were acquired using time averaging to provide a signal to noise level adequate to measure the signals of interest. Samples were dissolved in tetrachloroethane-d2 at concentrations between 10-15 wt % prior to being inserted into the spectrometer magnet. Spectra were referenced by setting the mmmm methyl signal to 21.83 ppm. Carbon multiplicity was determined in the same 700 MHz spectrometer using DEPT (distorsionless enhancement by polarization transfer) experiments.

Molecular weights (Mn and Mw) and polydispersities (Mw/Mn) were determined by high temperature gel permeation chromatography (GPC). Analyses were performed with a Waters Alliance GPCV 2000 GPC equipped with a Waters DRI detector and viscometer. The column set (four Waters HT 6E and one Waters HT 2) was eluted with 1,2,4-trichlorobenzene containing 0.01 wt % di-tert-butyl-hydroxytoluene (BHT) at 1.0 mL/min at 140° C. Data were calibrated using monomodal polyethylene standards (from Polymer Standards Service). The polymerization conditions and molecular weights are listed in FIG. 6.

The original powders were placed on rectangular 10×5×0.25 mm stainless steel frames and sandwiched between thin Teflon© films by melt compression in a Carver press at 180-200° C. (5 min, 1380 KPa). The plates were then taken a room temperature and left at ambient conditions for at least two weeks prior to the first DSC melting. Since some of the iPPs have slow crystallization kinetics at room temperature, a relatively long aging allows comparison of the melting behavior among the series at a stage when most of the iPP crystalline structure has evolved. Non-isothermal melting and crystallizations (10° C./min) were carried out using a differential scanning calorimeter Perkin Elmer DSC-7 under nitrogen flow. Temperature and heat calibrations were performed with indium as standard. Isothermal crystallization were carried out either in the DSC or in controlled temperature baths. To maximize heat transfer, the DSC was operated in conjunction with an intracooler and under dry nitrogen flow. In the DSC experiments, the films were melted at 180° C. for 3 minutes and cooled at 40° C./min to the required crystallization temperature.

WAXD and SAXS diffractograms were obtained at ambient temperature on samples that were previously isothermally crystallized either in the DSC or in thermostated baths using a Bruker Nanostar diffractometer with IμS micro-focus x-ray source, and equipped with a HiStar 2D Multiwire SAXS detector and a Fuji Photo Film image plate with Fuji FLA-7000 scanner for WAXD detection. SAXS profiles were calibrated with silver behenate and WAXD patterns with corundum, both standards were obtained from Bruker. The peak assignments for α and γ phase followed those given by Brückner and Meille (Brückner S.; Meille S. V. Nature (London) 1989, 340, 455) and Turner-Jones (Turner-Jones A.; Aizlewwod J. M.; Beckett D. R. Makromol. Chem. 1964, 75, 134).

The fractional content of the γ form was calculated, after subtraction of the amorphous halo from the areas of the reflection at 2θ=20.1° characteristic of γ form and the reflection of α form at 2θ=18.8°, as Aγ/(Aγ+Aγ). Peak fitting to mixed Gaussian and Lorentzian shapes was carried out with GRAMS. Crystallinity content derived by WAXD was evaluated from the x-ray powder diffraction profiles by the ratio between the crystalline diffraction area and the total area of the diffraction profile.

The thermodynamic and structural properties of iPPs with chain-walking defects, as examples of the novel polyolefins, have been comparatively studied in reference to control random iPP copolymers with comonomers excluded from the crystalline regions, such as the PH and PO copolymers. On a customary molar point defect composition based on 100 monomers, iPPs with chain-walking defects are found to melt at lower temperatures and display a dramatic depression of crystallinity at defect levels of 8-15 mol %. These features, coupled with lower crystallite thicknesses and enhanced contents of iPP crystallites in the gamma phase, are associated with a shortening of isotactic sequence lengths, caused by the bulky nature of most defects, compared with random copolymers. Chain-walking with (3,1) enchainment defects decrease the level of crystallinity of iPPs at a much faster rate than do any of the more common defects found in Ziegler-Natta or early metallocene made iPPs, or propylene random 1-alkene copolymers. Any other polyolefin with chain-walking defects that add extra backbone carbons per monomer will display similar depression of crystallinity.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense. The invention applies to any crystalline backbone polyolefin with random chain-walking defects, and entitles a reduction of crystallinity by increasing the length of the defect in terms of number of backbone carbon units. Any materials, which may be cited above, are fully incorporated herein by reference.

It is also to be understood that the following claims are intended to cover all of the generic and specific features of the invention herein described, and all statements of the scope of the invention which, as a matter of language, might be said to fall there between. Relative terminology, such as "substantially" or "about," describe the specified materials, steps, parameters or ranges as well as those that do not materially affect the basic and novel characteristics of the claimed inventions as whole (as would be appreciated by one of ordinary skill in the art).

What is claimed is:

1. A method to reduce crystallinity of a crystalline polyolefin comprising the steps of:
   introducing at least one regio defect characterized by isolated or successive (2,1) additions and enchainments due to chain-walking wherein a diimine-based catalyst is used to catalyze the chain-walking;
   wherein the enchainment straightens the monomer in the polyolefin backbone, adds extra backbone carbons and produces short crystallizable sequences without the need to use a comonomer; wherein the total regio defect percentage ranges between 3.0 to 20.0 mol %; and
   wherein the molecular weight of the polyolefin is between about 30,000 and 200,000 daltons.

2. The method of claim 1, wherein the regio defect consists of isolated (2,1) additions, successive (2,1) additions, isolated enchainments due to chain-walking, two or more successive chain-walking enchainments, successive chain-walking followed by a (2,1) enchainment, and alternating chain-walking and (1,2) additions.

3. A method for the manufacture of a crystalline polyolefin product with reduced crystallinity comprising the steps of:
   introducing at least one regio defect characterized by isolated or successive (2,1) additions and enchainments due to chain-walking wherein a diimine-based catalyst is used to catalyze the chain-walking;
   wherein the enchainment straightens the monomer in the polyolefin backbone, adds extra backbone carbons and produces short crystallizable sequences without the need to use a comonomer; wherein the total regio defect percentage ranges between 3.0 to 20.0 mol %; and
   wherein the molecular weight of the polyolefin is between about 30,000 and 200,000 daltons.

4. The polyolefin of claim 3, wherein the crystalline polyolefin is isotactic.

5. The polyolefin of claim 3, wherein the crystalline polyolefin is syndiotactic.

6. The polyolefin of claim 3, wherein the polyolefin is characterized by a polydispersity between about 1.14 and 1.46.

7. The method of claim 3, wherein the polyolefin product are plastic wrapping, films, fibers, molded parts, medical devices, co-extrusions layers and coatings.

8. The method of claim 3, wherein the regio defect consists of isolated (2,1) additions, successive (2,1) additions, isolated enchainments due to chain-walking, two or more successive chain-walking enchainments, successive chain-walking followed by a (2,1) enchainment, and alternating chain-walking and (1,2) additions.

* * * * *